(12) United States Patent
Yamana et al.

(10) Patent No.: US 8,061,908 B2
(45) Date of Patent: Nov. 22, 2011

(54) IMAGE SENSING APPARATUS

(75) Inventors: Kazuaki Yamana, Kawasaki (JP); Kiyokazu Churei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/842,596

(22) Filed: Jul. 23, 2010

(65) Prior Publication Data

US 2011/0052177 A1    Mar. 3, 2011

(30) Foreign Application Priority Data

Aug. 31, 2009  (JP) ................. 2009-201086

(51) Int. Cl.
*G03B 19/12*        (2006.01)
(52) U.S. Cl. ....................... 396/354; 396/358
(58) Field of Classification Search .......... 396/354, 396/356, 358
See application file for complete search history.

(56) References Cited

U.S. PATENT DOCUMENTS

| | | | |
|---|---|---|---|
| 5,294,952 A * | 3/1994 | Misawa | 396/447 |
| 5,768,644 A | 6/1998 | Tanabe | |
| 6,003,999 A * | 12/1999 | Kitaoka et al. | 359/872 |
| 2009/0245779 A1 * | 10/2009 | Negita | 396/358 |
| 2010/0189428 A1 * | 7/2010 | Kurahashi | 396/111 |

FOREIGN PATENT DOCUMENTS

JP         07-036105         2/1995

* cited by examiner

*Primary Examiner* — W. B. Perkey
*Assistant Examiner* — Linda B Smith
(74) *Attorney, Agent, or Firm* — Cowan, Liebowitz & Latman, P.C.

(57) ABSTRACT

An image sensing apparatus comprises: a mirror which reflects light coming from a photographing optical system at a mirror down position; a mirror support member which rotatably supports the mirror; a contacting member against which the mirror support member contacts at the mirror down position; a rotatable first lever member; and a second lever member to which the contacting member is secured, and which is rotatably held by the first lever member, wherein when the mirror moves to the mirror down position, the mirror support member contacts against the contacting member, the second lever member then rotates relative to the first lever member and contacts against the first lever member, and by rotating the first lever member, the first and second lever members rotate without changing a relative positional relationship, so as to adjust a position of the contacting member with respect to the mirror support member.

4 Claims, 6 Drawing Sheets

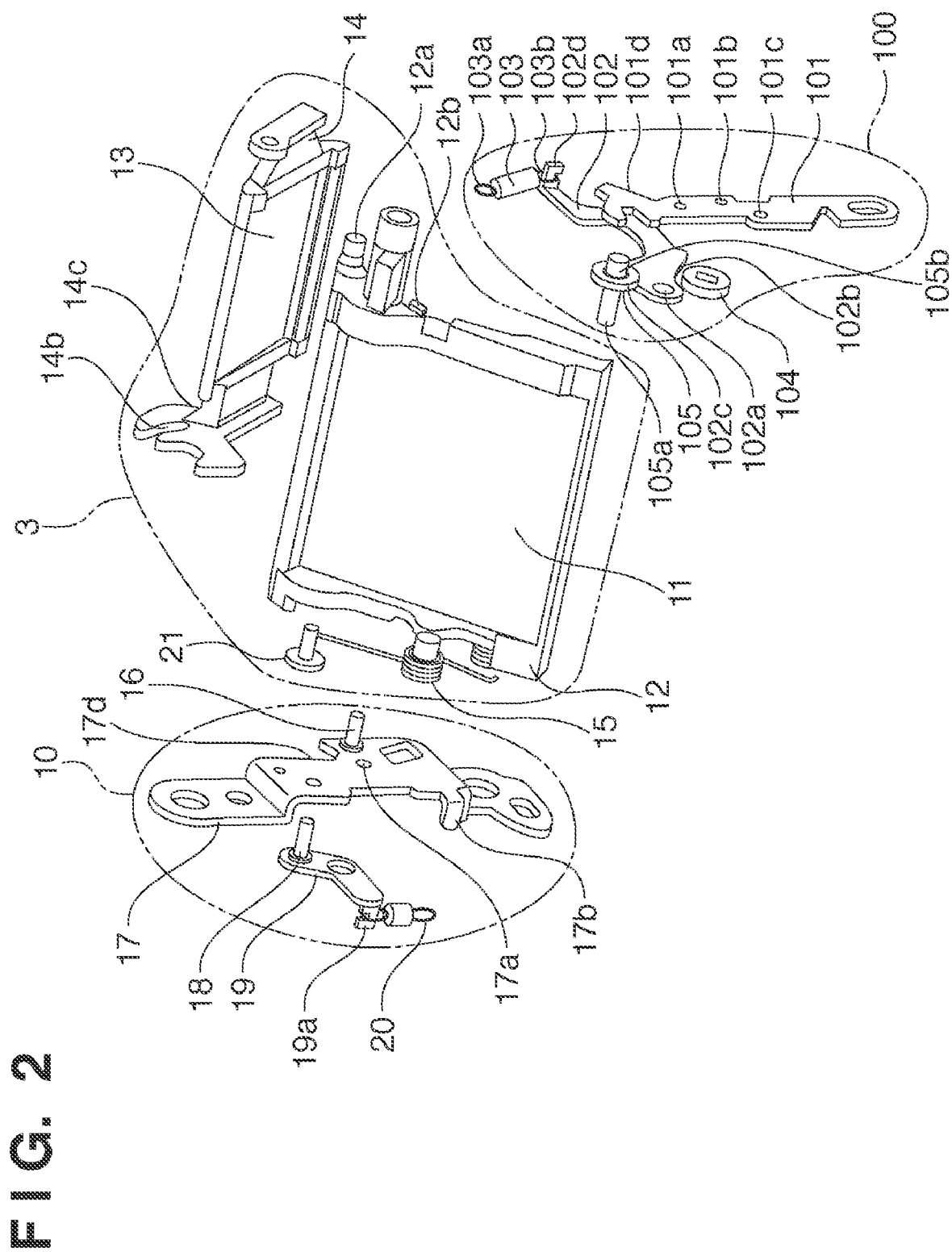
F I G. 2

IMAGE SENSING APPARATUS

BACKGROUND OF THE INVENTION

1. Field of the Invention

The present invention relates to an image sensing apparatus for suppressing bounds of, for example, a quick return mirror of an image sensing apparatus.

2. Description of the Related Arts

Conventionally, in a quick return mirror mechanism of, for example, a single-lens reflex camera, a main mirror and sub-mirror are rotated at high speed to positions inside and outside an optical path (photographing optical path) from a photographing optical system. In the photographing optical path, the mirrors are aligned at predetermined stop positions when they contact against stoppers arranged in a mirror box, and guide light to a viewfinder optical system and focus detection unit.

In the quick return mirror mechanism, a phenomenon in which the mirrors bound since they collide against the stoppers when the mirrors are rotated at high speed from the position outside the photographing optical path to the position inside the photographing optical path (to be referred to as a return timing hereinafter) occurs (to be referred to as a mirror bound phenomenon hereinafter). By shortening a time required to stop the mirror bound phenomenon (to be referred to as a bound suppression time), a focus detection operation can be started earlier, and a larger number of photographs per unit times can be taken in a continuous shooting mode.

For example, Japanese Patent Laid-Open No. 7-036105 describes a technique which decides a moment of inertia of a mirror support member and/or a mirror member so that a bound time in which each mirror collides against the mirror support member and bounds is shorter than the bound suppression time when the mirror support member is secured.

However, in Japanese Patent Laid-Open No. 7-036105, a stop position of the mirror support member changes when each mirror is aligned and adjusted. As a result of this change, since a movable range of a rotation alignment member changes, an impact absorption effect changes, thus causing bound suppression time variations.

SUMMARY OF THE INVENTION

The present invention has been made in consideration of the aforementioned problems, and realizes an image sensing apparatus which can always obtain a high bound suppression effect by eliminating bound suppression time variations as a result of angle adjustment of a mirror.

In order to solve the aforementioned problems, the present invention provides an image sensing apparatus comprising: a mirror configured to reflect light coming from a photographing optical system when the mirror is located at a mirror down position; a mirror support member configured to rotatably support the mirror; a contacting member against which the mirror support member contacts when the mirror is located at the mirror down position; a rotatable first lever member; and a second lever member to which the contacting member is secured, and which is rotatably held by the first lever member, wherein when the mirror moves to the mirror down position, the mirror support member contacts against the contacting member, the second lever member then rotates relative to the first lever member and contacts against the first lever member, and by rotating the first lever member, the first lever member and the second lever member rotate without changing a relative positional relationship, so as to adjust a position of the contacting member with respect to the mirror support member.

According to the present invention, an image sensing apparatus, which can always obtain a high bound suppression effect by eliminating bound suppression time variations as a result of angle adjustment of a mirror, can be realized.

Further features of the present invention will become apparent from the following description of exemplary embodiments (with reference to the attached drawings).

BRIEF DESCRIPTION OF THE DRAWINGS

FIG. 2 is an exploded view of a quick return mirror unit and bound suppression mechanism according to the first embodiment;

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

First Embodiment

Figure 1:
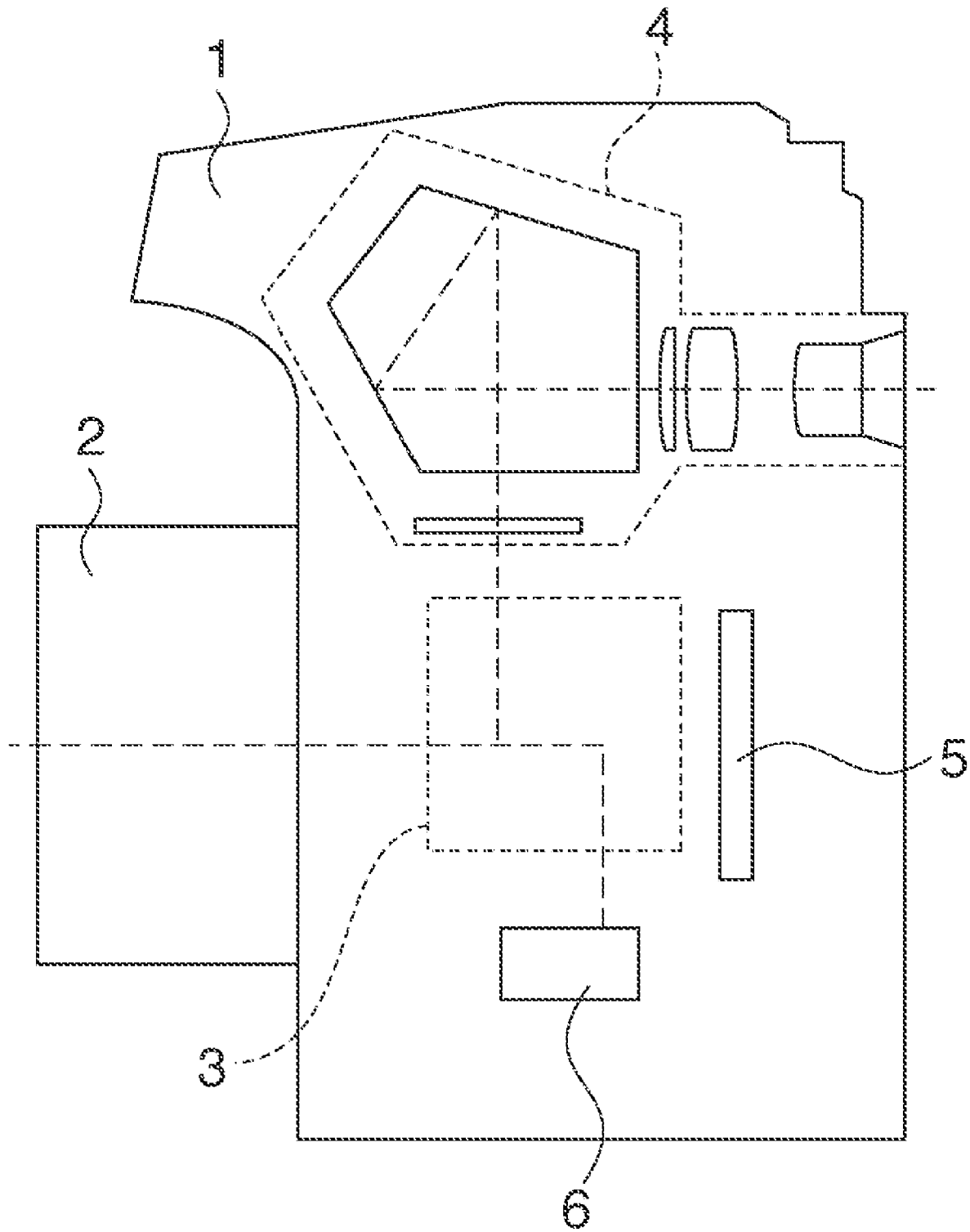
FIG. 1 is a schematic view showing the arrangement of an image sensing apparatus according to an embodiment of the present invention.

The arrangement of an image sensing apparatus according to this embodiment will be described first with reference to FIG. 1. Referring to FIG. 1, reference numeral 1 denotes an image sensing apparatus such as a single-lens reflex camera; 2, a photographing lens; 3, a quick return mirror unit; and 4, an optical viewfinder unit required to view an object image. Reference numeral 5 denotes an image sensing unit which includes an image sensing element such as a CMOS sensor or CCD sensor or a film, a holding member of the element or film, and various filters; and 6, a focus detection device.

The arrangement of the quick return mirror unit 3 and mirror bound suppression mechanisms 10 and 100 of this embodiment will be described below with reference to FIG. 2. Referring to FIG. 2, reference numeral 11 denotes a main mirror configured by a half mirror, which is secured to a main mirror support member 12. A shaft 12a of the main mirror support member 12 is axially supported by a mirror box (not shown) to be rotatable. The main mirror support member 12 is rotatable between a mirror down position (view position) in a photographing optical path, which position is required to view an object image, and a mirror up position (photographing position) outside the photographing optical path, which position is retracted from the photographing optical path.

At the mirror down position, the main mirror 11 reflects some light components from a photographing optical system to guide them to the viewfinder optical system 4, and transmits the remaining light components through itself. As a result, a photographer can view an object image via the viewfinder optical system 4. At the mirror up position, the main mirror 11 is retracted outside the photographing optical path so as to permit photoelectric conversion of an object image, which is formed by the photographing optical system, by the image sensing unit 5.

An angle adjustment plate 101 as a first lever member has a hole 101c. The angle adjustment plate 101 is axially supported by a shaft of the mirror box (not shown) to be rotatable about the hole 101c. A rotational center 102a of a rotation lever 102 as a second lever member is caulked to the hole 101c of the angle adjustment plate 101, so that the rotation lever 102 is axially supported by the angle adjustment plate 101 to be rotatable about the rotational center 102a. A movable end 103b of a lever extension coil spring 103 as an urging member is latched to an end portion 102d of the rotation lever 102. An angle adjustment pin 105 as a contacting member, against which the main mirror support member 12 contacts when the main mirror 11 is located at the mirror down position, is secured by the rotation lever 102 and its secure surface 102c.

A secured end 103a as one end of the lever extension coil spring 103 is secured to the mirror box (not shown), and the rotation lever 102 is urged counterclockwise since an urging force always acts from the movable end 103b toward the secured end 103a. By the counterclockwise urging force of the lever extension coil spring 103, an end face 105b of the angle adjustment pin 105 contacts against a slant portion 101d of the angle adjustment plate 101. An end portion 105a of the angle adjustment pin 105 contacts the main mirror support member 12, and holds the main mirror 11 to the mirror down position by limiting a counterclockwise rotation of the main mirror support member 12 about the shaft 12a.

An impact absorption rubber member 104 as an elastic member is secured to the angle adjustment plate 101. The impact absorption rubber member 104 collides against a slant portion 102b of the rotation lever 102 when the rotation lever 102 rotates clockwise against the urging force of the lever extension coil spring 103. Then, the impact absorption rubber member 104 restricts the rotation range of the rotation lever 102, and absorbs a rotation motion energy of the rotation lever 102.

Reference numeral 13 denotes a sub-mirror, which is secured to a sub-mirror support member 14. The sub-mirror support member 14 is axially supported by a shaft 12b of the main mirror support member 12 to be rotatable, and a predetermined object image is output to the focus detection device 6 in a state in which the main mirror support member 12 stops at the mirror down position.

When the main mirror support member 12 rotates to the mirror up position, the sub-mirror support member 14 rotates up to the mirror up position together with the main mirror support member 12. With respect to the main mirror support member 12, a sub-mirror urging spring 15 urges the sub-mirror support member 14 counterclockwise at the mirror down position and clockwise at the mirror up position, to have the shaft 12b as the center.

A sub-mirror angle secure pin 16 is secured to a sub-mirror angle secure plate 17, and serves as a stopper of the sub-mirror support member 14. That is, the sub-mirror angle secure pin 16 holds the sub-mirror support member 14 to the mirror up position by limiting a counterclockwise rotation of the sub-mirror support member 14 about the shaft 12b of the main mirror support member 12.

The sub-mirror support member 14 has a hook-shaped portion 14b. Reference numeral 18 denotes a sub-mirror hook pin (bound suppression pin), which is secured to a sub-mirror hook plate 19. The sub-mirror hook plate 19 rotates about a hole 17a formed in the sub-mirror angle secure plate 17. The sub-mirror hook plate 19 is urged counterclockwise about the hole 17a by a sub-mirror hook extension coil spring 20, which is hooked between a bent portion 19a of the sub-mirror hook plate 19 and a bent portion 17b of the sub-mirror angle secure plate 17.

A counterclockwise rotation of the sub-mirror hook plate 19 about the hole 17a is limited when the sub-mirror hook pin 18 contacts a side surface portion 17d of the sub-mirror angle secure plate 17. Reference numeral 21 denotes a sub-mirror reversal pin, which is secured to the mirror box (not shown).

Figure 3A:
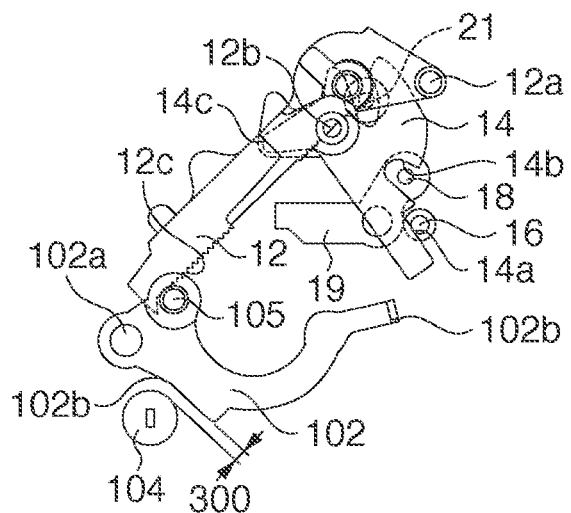
FIGS. 3A to 3F are side views of FIG. 2 to explain actions of a main mirror and sub-mirror according to the first embodiment.
Figure 3B:
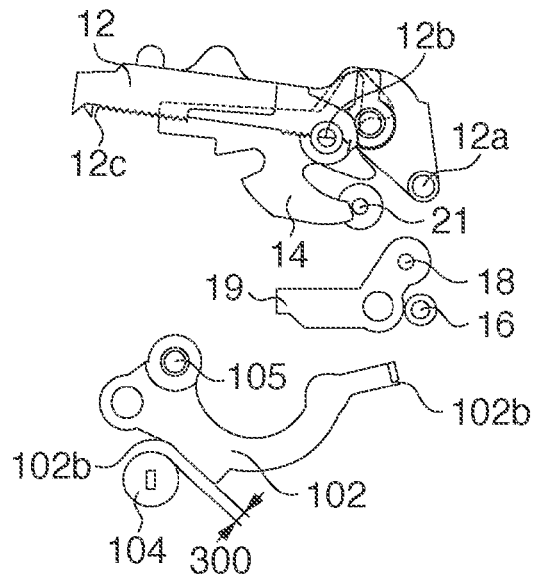

The actions of the main mirror and sub-mirror of this embodiment will be described below with reference to FIGS. 3A to 3F. FIG. 3A shows the mirror down position. When a photographing operation starts, the main mirror support member 12 rotates clockwise to the mirror up position about the shaft 12a of the main mirror support member 12 after a predetermined sequence.

During this process, when a cam-shaped portion 14c of the sub-mirror support member 14 contacts the sub-mirror reversal pin 21, the sub-mirror support member 14 rotates clockwise to the mirror up position about the shaft 12b. When an exposure process is complete via a predetermined sequence in a state of FIG. 3B as the mirror up position, the main mirror support member 12 rotates counterclockwise about the shaft 12a, and returns from the mirror up position to the mirror down position.

Figure 3C:
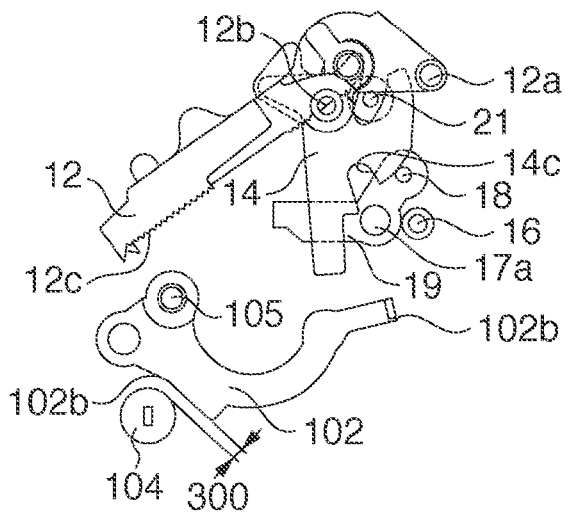

In synchronism with the return action of the main mirror support member 12, the sub-mirror support member 14 also rotates counterclockwise about the shaft 12b when the cam-shaped portion 14c of the sub-mirror support member 14 contacts the sub-mirror reversal pin 21, and returns from the mirror up position to the mirror down position. During the return process, the hook-shaped portion 14b of the sub-mirror support member 14 contacts against the sub-mirror hook pin 18 (FIG. 3C).

Figure 3D:
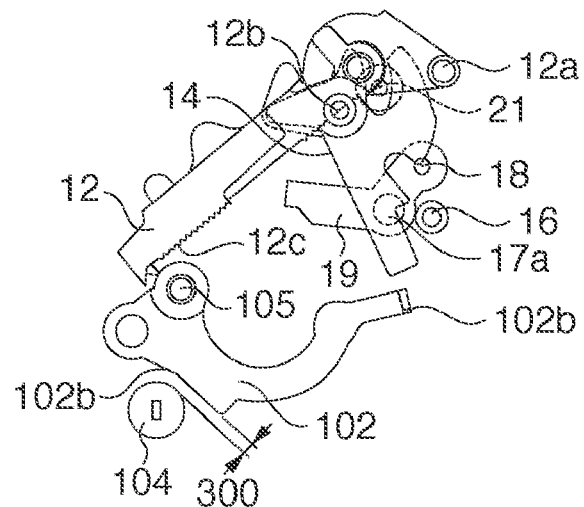

With this contacting action, the sub-mirror hook pin 18 rotates clockwise about the hole 17a of the sub-mirror angle secure plate 17, and the sub-mirror hook pin 18 moves to a position outside a return moving path of the sub-mirror support member 14 (FIG. 3D).

After that, the sub-mirror support member 14 contacts against the sub-mirror angle secure pin 16. The sub-mirror hook pin 18 rotates counterclockwise about the hole 17a by the urging force of the sub-mirror hook extension coil spring 20, and enters inside the hook-shaped portion 14b of the sub-mirror support member 14.

The sub-mirror support member 14, which contacts against the sub-mirror angle secure pin 16, then contacts against the sub-mirror hook pin 18 at the hook-shaped portion 14b. The sub-mirror support member 14 stops while contacting against the sub-mirror angle secure pin 16 by the urging force of the sub-mirror urging spring 15 while repetitively bounding between the sub-mirror angle secure pin 16 and sub-mirror hook pin 18.

Figure 3E:
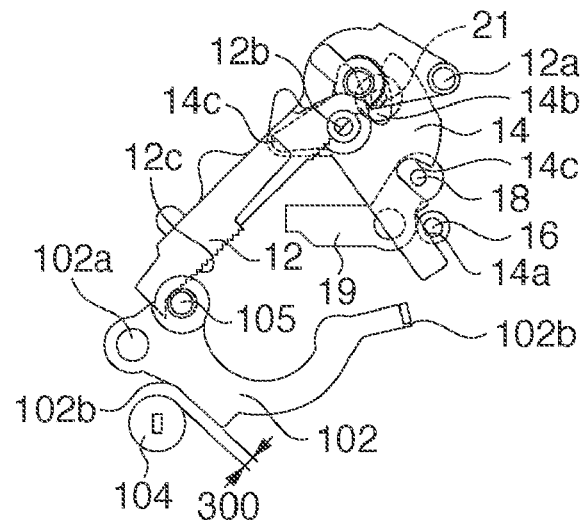

Nearly simultaneously with the state in which the sub-mirror support member 14 repetitively bounds between the sub-mirror angle secure pin 16 and sub-mirror hook pin 18, a flat portion 12c of the main mirror support member 12 contacts against the end portion 105a of the angle adjustment pin 105 (FIG. 3E).

Figure 3F:
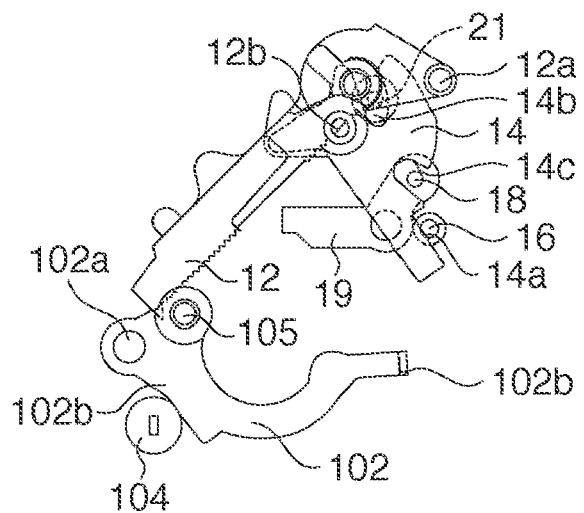

With this contacting action, the angle adjustment pin 105 rotates clockwise about the hole 101a of the angle adjustment plate 101, and moves to a position outside a return moving path of the main mirror support member 12 (FIG. 3F).

The slant portion 102b of the rotation lever 102 collides against the impact absorption rubber member 104, which restricts the rotation range of the rotation lever 102, while the rotation lever 102 is rotating integrally with the angle adjustment pin 105. To the end portion 102d of the rotation lever 102, the movable end 103b as the other end of the lever extension coil spring 103 is latched, and the lever extension coil spring 103 is stretched and contracted upon rotations of the rotation lever 102.

The rotation motion energy of the main mirror support member 12 upon returning from the mirror up position to the mirror down position is converted into a rotation motion of the rotation lever 102. Also, the rotation motion energy of the rotation lever 102 is damped by collision between the impact absorption rubber member 104 and rotation lever 102, and stretching/contraction of the lever extension coil spring 103. As a result, the bound phenomenon of the main mirror support member 12 is suppressed, thus shortening the bound suppression time.

In this embodiment, since the hook-shaped portion 14b contacts the sub-mirror hook pin 18, and the sub-mirror angle secure pin 16 contacts a portion 14a of the sub-mirror support member 14, bounding of the sub-mirror support member 14 is suppressed. Also, bounding of the main mirror support member 12 is suppressed by rotation of the rotation lever 102. Then, the bound suppression time at the mirror return timing is shortened.

Figure 4A:
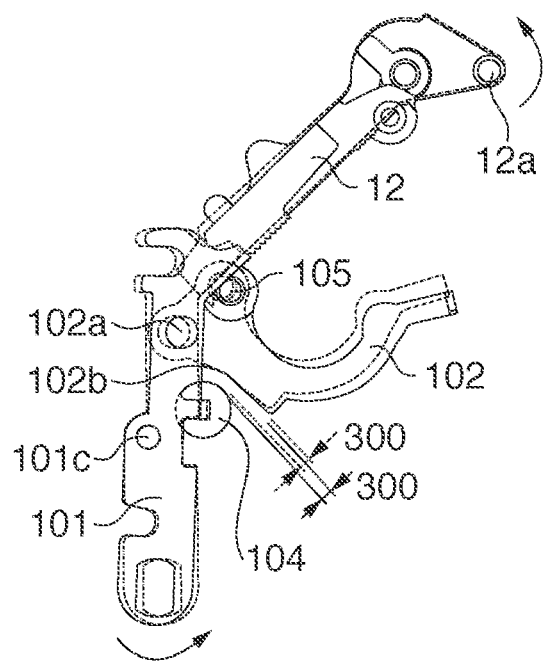
FIGS. 4A and 4B are side views of FIG. 2 to explain angle adjustment of the main mirror according to the first embodiment.
Figure 4B:
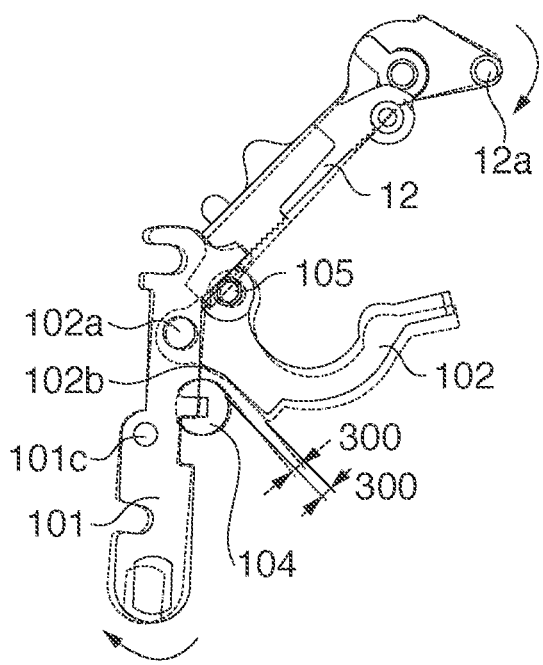

Angle adjustment of the main mirror 11 with respect to the photographing optical axis will be described below with reference to FIGS. 4A and 4B. Referring to FIGS. 4A and 4B, the angle adjustment plate 101 has the hole 101c. The angle adjustment plate 101 is axially supported by the shaft of the mirror box (not shown) to be rotatable about the hole 101c. The angle adjustment plate 101, rotation lever 102, impact absorption rubber member 104, and angle adjustment pin 105 integrally rotate about the hole 101c of the angle adjustment plate 101 as the rotational center. Therefore, even when the angle adjustment plate 101 is rotated, the relative positional relationship among the angle adjustment plate 101, rotation lever 102, impact absorption rubber member 104, and angle adjustment pin 105 remains unchanged.

Arrows in FIGS. 4A and 4B indicate rotation directions of the main mirror support member 12 and angle adjustment plate 101 upon angle adjustment of the main mirror 11. The solid lines in FIGS. 4A and 4B indicate the position of the mirror bound suppression mechanism 100 before angle adjustment, and the broken lines indicate the main mirror support member 12, angle adjustment plate 101, angle adjustment pin 105, rotation lever 102, and impact absorption rubber member 104 after angle adjustment, respectively. Reference numeral 300 denotes a rotatable range of the rotation lever 102 until it collides against the impact absorption rubber member 104.

In FIG. 4A, by rotating the angle adjustment plate 101 counterclockwise about the hole 101c, the angle of the main mirror 11 is adjusted with respect to the photographing optical axis. In FIG. 4B, by rotating the angle adjustment plate 101 clockwise about the hole 101c, the angle of the main mirror is adjusted with respect to the optical axis. In this manner, the angle adjustment is done within the broken line ranges in FIGS. 4A and 4B.

In the angle adjustment process of the main mirror 11 with respect to the photographing optical axis, the rotation lever 102, impact absorption rubber member 104, and angle adjustment pin 105 rotate through the same rotation angle as that of the angle adjustment plate 101 about the rotational center (hole 101c) of the angle adjustment plate 101. That is, the angle adjustment plate 101, rotation lever 102, impact absorption rubber member 104, and angle adjustment pin 105 integrally rotate about the hole 101c of the angle adjustment plate 101 as the rotational center. Therefore, even when the angle adjustment plate 101 is rotated to adjust the angle of the main mirror 11 with respect to the photographing optical axis, the relative positional relationship among the angle adjustment plate 101, rotation lever 102, impact absorption rubber member 104, and angle adjustment pin 105 remains unchanged. As shown in FIGS. 4A and 4B, a distance 300 until the rotation lever 102 collides against the impact absorption rubber member 104 is always kept constant even when the angle of the main mirror 11 is adjusted with respect to the photographing optical axis.

As described above, since the distance 300 until the rotation lever 102 collides against the impact absorption rubber member 104 is kept constant, a damping effect upon collision between the impact absorption rubber member 104 and rotation lever 102 and that upon stretching/contraction of the lever extension coil spring 103 are kept nearly constant, thus always obtaining a stable bound suppression effect. In this embodiment, the impact absorption rubber member 104 is secured to the angle adjustment plate 101, but it may be secured to the rotation lever 102.

Second Embodiment

Figure 5:
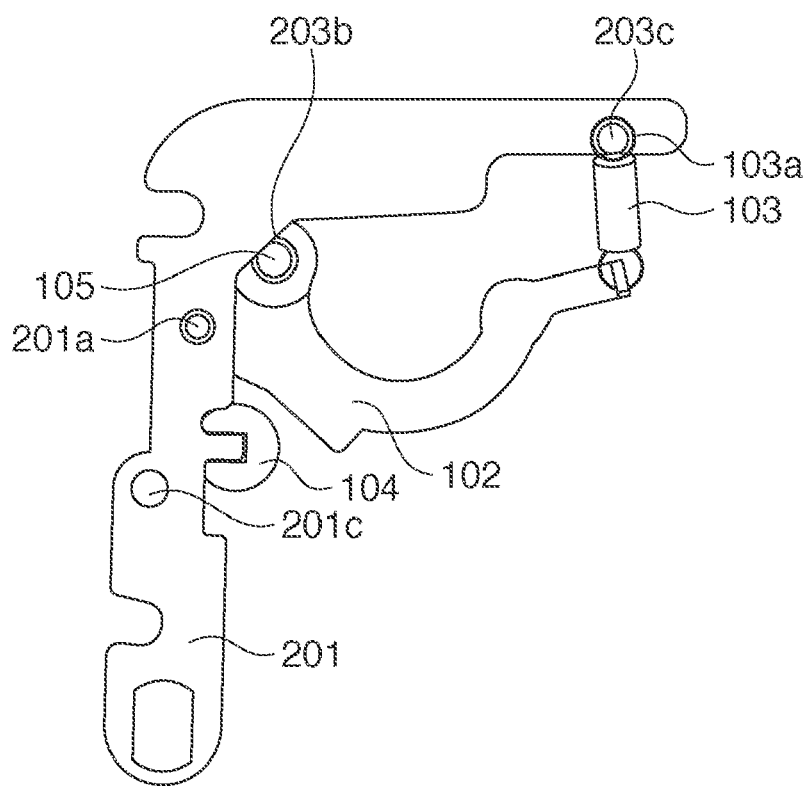
FIG. 5 is a side view of a mirror bound suppression mechanism according to the second embodiment.

A mirror bound suppression mechanism of the second embodiment will be described below with reference to FIG. 5 and FIGS. 6A and 6B. A secured end 103a of a lever extension coil spring 103, which is latched to a mirror box (not shown) in the first embodiment, is latched to a shaft 203c secured to an angle adjustment plate 201, as shown in FIG. 5. That is, one end of the lever extension coil spring 103 as a urging member is latched to the shaft 203c, and the other end is latched to an end portion 102d of a rotation lever 102. The angle adjustment plate 201 has a hole 201c, and is axially supported by a shaft of the mirror box (not shown) to be rotatable about this hole 201c. The rotation lever 102 is axially supported by the angle adjustment plate 201 to be rotatable. An impact absorption rubber member 104 is secured to the angle adjustment plate 201.

The rotation lever 102, the impact absorption rubber member 104, and an angle adjustment pin 105 secured to the rotation lever 102 rotate through the same rotation angle as that of the angle adjustment plate 201 about the rotational center (hole 201c) of the angle adjustment plate 201. Arrows in FIGS. 6A and 6B indicate rotation directions of a main mirror support member 12 and the angle adjustment plate 201 upon angle adjustment. The solid lines in FIGS. 6A and 6B indicate the position of the mirror bound suppression mechanism before angle adjustment, and the broken lines indicate the main mirror support member 12, angle adjustment plate 201, angle adjustment pin 105, rotation lever 102, and impact absorption rubber member 104 after angle adjustment. Reference numeral 400 denotes a range until the rotation lever 102 collides against the impact absorption rubber member 104.

Figure 6A:
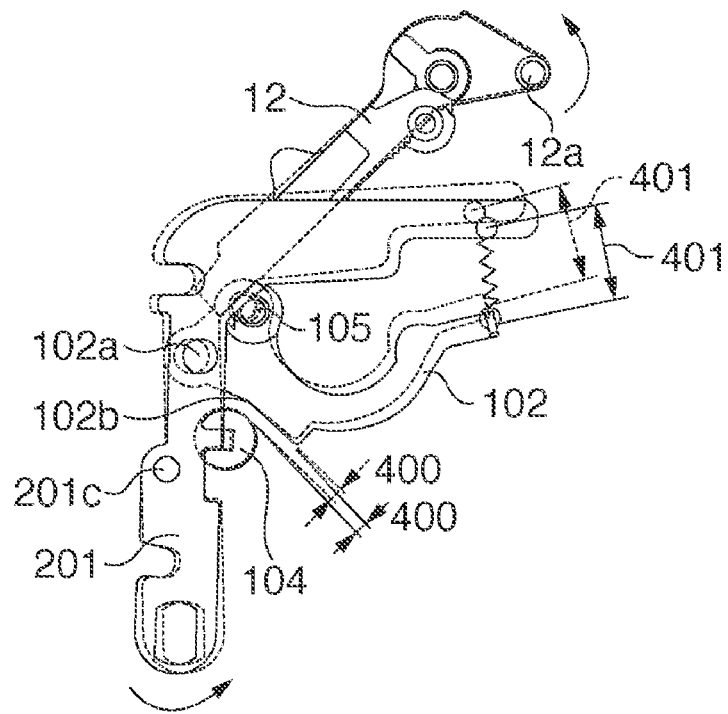
FIGS. 6A and 6B are side views for explaining angle adjustment of a main mirror according to the second embodiment.

In FIG. 6A, by rotating the angle adjustment plate 201 counterclockwise about the hole 201c, the angle of a main mirror 11 is adjusted with respect to the optical axis. In FIG. 6B, by rotating the angle adjustment plate 201 clockwise about the hole 201c, the angle of the main mirror is adjusted with respect to the optical axis. In this manner, the angle adjustment is done within the broken line ranges in FIGS. 6A and 6B.

In the angle adjustment process of the main mirror 11 with respect to the photographing optical axis, the rotation lever 102, impact absorption rubber member 104, and angle adjustment pin 105 rotate through the same rotation angle as that of the angle adjustment plate 201 about the rotational center (hole 201c) of the angle adjustment plate 201. That is, the angle adjustment plate 201, rotation lever 102, impact absorption rubber member 104, and angle adjustment pin 105 integrally rotate about the hole 201c of the angle adjustment plate 201 as the rotational center. Therefore, even when the angle adjustment plate 201 is rotated to adjust the angle of the main mirror 11 with respect to the photographing optical axis, the relative positional relationship among the angle adjustment plate 201, rotation lever 102, impact absorption rubber member 104, and angle adjustment pin 105 remains unchanged. As shown in FIGS. 6A and 6B, even when the angle of the main mirror 11 is adjusted with respect to the photographing optical axis, a distance 400 until the rotation lever 102 collides against the impact absorption rubber member 104 is always kept constant.

Figure 6B:
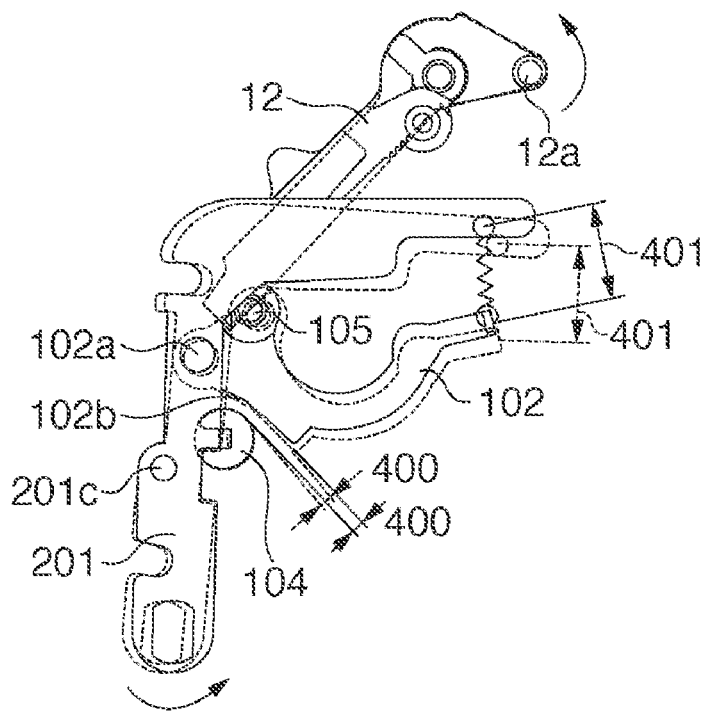

Furthermore, as shown in FIGS. 6A and 6B, a distance 401 between the end portion 102d of the rotation lever 102, to which the lever extension coil spring 103 is latched, and the shaft 203c is kept constant even when the angle of the main mirror 11 is adjusted with respect to the photographing optical axis. Therefore, even when the angle of the main mirror 11 is adjusted with respect to the photographing optical axis, the urging force of the lever extension coil spring 103 is also kept constant. That is, in this embodiment, even when the angle of the main mirror 11 is adjusted with respect to the photographing optical axis, the distance 400 until the rotation lever 102 collides against the impact absorption rubber member 104 can be kept constant, and the urging force of the lever extension coil spring 103 can also be kept constant.

As described above, since the rotatable range of the rotation lever 102 is kept constant, a damping effect upon collision between the impact absorption rubber member 104 and rotation lever 102 and that upon stretching/contraction of the lever extension coil spring 103 are kept constant, thus always obtaining a stable bound suppression effect.

Furthermore, since the urging force of the lever extension coil spring 103 is kept constant, when, for example, a sliding friction of the rotation lever 102 influences the bound suppression effect, a more stable bound suppression effect can be obtained than the case of the first embodiment.

Note that the impact absorption rubber member 104 is secured to the angle adjustment plate 201 in the second embodiment, but it may be secured to the rotation lever 102.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2009-201086, filed Aug. 31, 2009, which is hereby incorporated by reference herein in its entirety.

What is claimed is:

1. An image sensing apparatus comprising:
a mirror configured to reflect light coming from a photographing optical system when said mirror is located at a mirror down position;
a mirror support member configured to rotatably support said mirror;
a contacting member against which said mirror support member contacts when said mirror is located at the mirror down position;
a rotatable first lever member; and
a second lever member to which said contacting member is secured, and which is rotatably supported by said first lever member,
wherein when said mirror moves to the mirror down position, said mirror support member contacts against said contacting member, said second lever member then rotates relative to said first lever member and contacts against said first lever member, and
by rotating said first lever member, said first lever member and said second lever member rotate without changing a relative positional relationship, so as to adjust a position of said contacting member with respect to said mirror support member.

2. The apparatus according to claim 1, wherein an elastic member is secured to said first lever member, when said mirror moves to the mirror down position, said mirror support member contacts against said contacting member, and said second lever member then rotates relative to said first lever member and contacts against the elastic member.

3. The apparatus according to claim 1, further comprising:
an urging member configured to apply a urging force to said second lever member,
wherein when said mirror moves to the mirror down position, said mirror support member contacts against said contacting member, and said second lever member rotates relative to said first lever member against the urging force of said urging member.

4. The apparatus according to claim 3, wherein one end of said urging member is latched to said first lever member, and the other end is latched to said second lever member.

* * * * *